Sept. 3, 1957 H. L. ADKISON 2,804,716
FISHING TROT LINE HOOK RETAINER AND DISPENSER
Filed Sept. 7, 1955
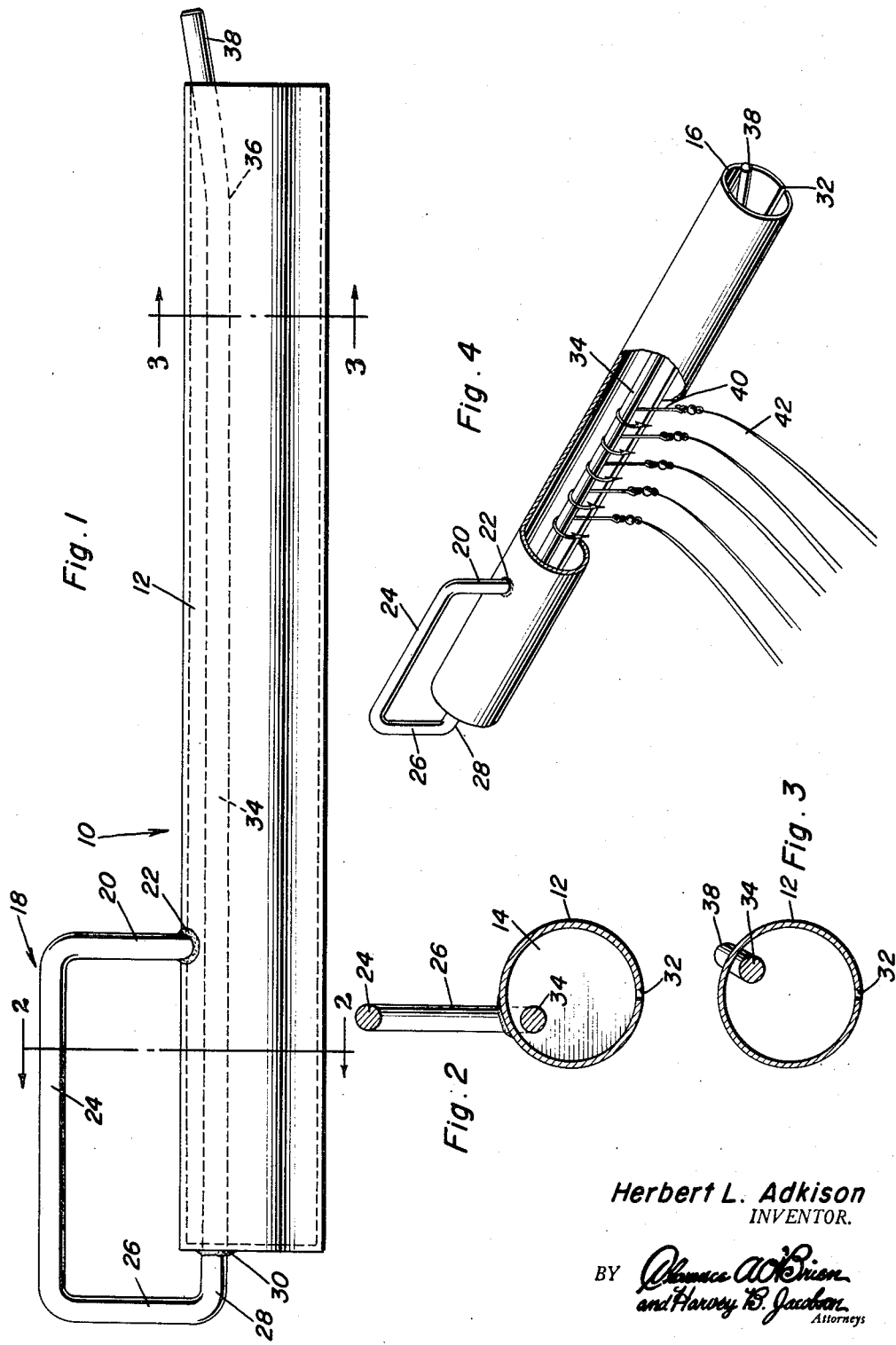
Herbert L. Adkison
INVENTOR.

United States Patent Office 2,804,716
Patented Sept. 3, 1957

2,804,716
FISHING TROT LINE HOOK RETAINER AND DISPENSER
Herbert L. Adkison, Cushing, Okla.
Application September 7, 1955, Serial No. 532,862
1 Claim. (Cl. 43—54.5)

This invention generally relates to a device useful in fishing, and more specifically provides a trot line hook retainer and dispenser for holding the hooks on a supporting member wherein the hooks may be readily dispensed therefrom but are normally retained thereon.

An object of the present invention is to provide a fishing trot line hook retainer and dispenser of a portable nature having means for normally retaining a plurality of hooks in aligned and supported position but yet permitting the hooks to be easily removed therefrom wherein inherent resiliency of the supporting member permits removal of and replacement of the hooks in relation to the supporting member.

In the construction of the invention, it is a further object to provide a fishing trot line hook retainer and dispenser which is extremely simple, efficient, easy to carry, easy to operate and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the fishing trot line hook retainer and dispenser;

Figure 2 is a transverse, vertical sectional view taken substantially upon a plane passing along section line 2—2 of Figure 1 showing the relationship of the handle together with the details of the tubular member and the supporting rod positioned therein;

Figure 3 is a transverse vertical sectional view taken substantially upon a plane passing along section line 3—3 of Figure 1, and illustrating the relationship of the supporting rod and the angulated end thereof with the tubular member; and Figure 4 is a perspective view of the present invention with portions thereof broken away illustrating a series of hooks mounted on the supporting rod.

Referring now specifically to the drawings, the numeral 10 generally designates the fishing trot line hook retainer and dispenser which includes in its construction an elongated cylindrical tubular member 12 having a closed end 14 and an open end 16. Adjacent the closed end 14 of the tubular member 12 is a generally inverted U-shaped handle generally designated by the numeral 18 which includes a leg portion 20 attached to the wall of the tubular member 12, as by welding 22 or any suitable securing means. The bight portion 24 of the handle 18 is disposed in generally spaced parallel relation to the wall of the tubular member 12 for providing a hand grip and the other leg 26 extends transversely across a portion of the closed end 14 and terminates in an inturned end portion 28 which is secured to the outer surface of the closed end 14, as by welding 30 or by any other suitable securing means. The handle 18 provides means for carrying the hook retainer and dispenser 10 in either a generally horizontal, vertical or any angular position.

The tubular member 12 is provided with an elongated slot 32 therein which communicates with the open end 16 and extends completely through the closed end 14 in generally diametrically opposed relation to the handle 18, although the handle 18 is disposed in offset relation.

Mounted within the tubular member 12 is an elongated supporting rod 34 which is secured to the closed end 14 and actually forms an extension of the end portion 28 of the handle 18. The elongated rod 34 is disposed in offset relation to the slot 32 wherein the slot 32 is substantially positioned under the center of the tubular member 12 and the rod 34 is offset therefrom. The outer free end of the rod 34 projects from the free end 16 of the tubular member 12 and is angulated at a point designated by the numeral 36. The angulated end 38 is in contact with the end of the wall forming the open end 16 of the tubular member 12, wherein hooks 40 having lines 42 attached thereto may be supported on the rod 34 with the shanks of the hooks 40 projecting through the slot 32 and the hooked end portion of the hooks 40 supported on the rod 34. The contact of the angulated end 38 with the wall of the tubular member 12 prevents normal removal of the hooks 40 by sliding movement off the end of the rod 34. However, by exerting more pressure than would be exerted by the hook itself, the hook 40 may be removed from the end of the rod 34 or may be positioned thereon for storage purposes. The retention of the hooks 40 is accomplished by the inherent resiliency of the rod 34 and its normal position which is in contact with the wall of the tubular member 12 under a certain amount of tension. This will permit the entire device to be carried in a vertical manner or in any angular position, and the hooks will not slide off until such time as the hooks are positively removed outwardly of the slot 32.

Since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A fishing trot line hook retainer and dispenser comprising an elongated tubular member having one open end and an end wall closing the other end thereof a handle adjacent the closed end of the tubular member, said handle having one leg thereof secured to the tubular member in spaced relation to the closed end thereof, a bight portion paralleling the longitudinal axis of the tubular member and extending beyond the closed end thereof, the other leg of the handle extending parallel to the end wall of the tubular member and terminating in longitudinally spaced relation to the end wall of the tubular member, and an elongated rod extending through said end wall and being connected to the inner end of said other leg of the handle, said rod extending throughout the length of the tubular member and projecting from the outer end thereof, said rod being disposed in adjacent spaced relation to the peripheral wall of the tubular member, said tubular member having a longitudinal slot extending throughout the length of the tubular member whereby hooks may be supported from said rod with the shanks extending through said slot whereby the hooks may be moved longitudinal through the open end of the tubular member for dispensing thereof, the free end of said rod being angularly inclined into contact with the end of the peripheral wall of the tubular member and being constructed of resilient material for permitting sufficient lateral deflection of the free end thereof for assembly and removal of the hooks from the rod.

References Cited in the file of this patent

UNITED STATES PATENTS

| 2,242,509 | Coalson | May 20, 1941 |
| 2,555,397 | Coward | June 5, 1951 |

FOREIGN PATENTS

| 118,175 | Sweden | Feb. 18, 1947 |